(12) United States Patent
Haupt et al.

(10) Patent No.: US 9,476,520 B2
(45) Date of Patent: Oct. 25, 2016

(54) HVAC DOOR WITH INTERSECTING SURFACE CONFIGURATIONS

(71) Applicant: VISTEON GLOBAL TECHNOLOGIES, INC., Van Buren Township, MI (US)

(72) Inventors: Eric Keith Haupt, Livonia, MI (US); Jim Patrick Nolta, Jr., Canton, MI (US); Shankar Patil, Farmington, MI (US)

(73) Assignee: HANON SYSTEMS, Daejeon-Si (KR)

( * ) Notice: Subject to any disclaimer, the term of this patent is extended or adjusted under 35 U.S.C. 154(b) by 730 days.

(21) Appl. No.: 13/827,847

(22) Filed: Mar. 14, 2013

(65) Prior Publication Data

US 2014/0261822 A1 Sep. 18, 2014

(51) Int. Cl.
*F16K 47/04* (2006.01)
*B60H 1/00* (2006.01)

(52) U.S. Cl.
CPC ......... *F16K 47/045* (2013.01); *B60H 1/00678* (2013.01); *B60H 2001/00721* (2013.01); *Y10T 137/206* (2015.04)

(58) Field of Classification Search
CPC .......... B60H 2001/00721; B60H 2001/00714; B60H 1/00664; B60H 1/00678; B60H 2001/006; B60H 1/34; B60H 1/3421; B60H 1/3414; B60H 1/3428; B60H 1/3435; B60H 1/3442; F16K 47/045

USPC ................. 454/155, 152, 333; D23/387, 392
See application file for complete search history.

(56) References Cited

U.S. PATENT DOCUMENTS

| | | | |
|---|---|---|---|
| 3,358,576 A | 12/1967 | Kelly et al. | |
| 6,159,092 A * | 12/2000 | Elder | B60H 1/3421 454/152 |
| 6,583,855 B2 | 6/2003 | Krikke et al. | |
| 7,121,057 B1 | 10/2006 | Pilcher | |
| 8,226,068 B2 | 7/2012 | Azar et al. | |
| 2010/0087133 A1* | 4/2010 | Kleinow | B60H 1/00857 454/152 |
| 2012/0329376 A1 | 12/2012 | Liu et al. | |

FOREIGN PATENT DOCUMENTS

| JP | 2004114828 A | 4/2004 |
|---|---|---|
| KR | 20080041882 A * | 5/2008 |
| KR | 1020080041882 A | 5/2008 |
| WO | 2007101953 A1 | 9/2007 |

* cited by examiner

*Primary Examiner* — Steven B McAllister
*Assistant Examiner* — Ko-Wei Lin
(74) *Attorney, Agent, or Firm* — Fraser Clemens Martin & Miller LLC; James D. Miller

(57) ABSTRACT

A fluid distribution door for use in a heating, ventilating, and air conditioning system includes a main body having a first surface and a second surface. The first surface and the second surface cooperate to form a first surface configuration which intersects with a second surface configuration. Each of the first surface configuration and the second surface configuration is formed by a three-dimensional feature.

14 Claims, 4 Drawing Sheets

… (1) …

HVAC DOOR WITH INTERSECTING SURFACE CONFIGURATIONS

FIELD OF THE INVENTION

The invention relates to a fluid flow distribution door, and more particularly, to a fluid flow distribution door for use in a vehicle climate control system.

BACKGROUND OF THE INVENTION

Fluid distribution doors in vehicle climate control or heating, ventilating, and fluid conditioning (HVAC) systems distribute a fluid through the vehicle according to passenger settings. Varying pressures within the HVAC system can cause unsteady forces which impede fluid distribution and lead to vortex shedding, door vibration or flutter, which ultimately leads to noise resonating throughout the HVAC system. Typically, the HVAC systems are generally closed systems, which amplify noise produced therewithin. Vortex shedding is defined as an unsteady flow of fluid that is caused by fluid movement past a blunt or bluff object (e.g. the fluid distribution door). The flow of the fluid past the fluid distribution door can produce alternating low pressure vortices. When this occurs, the fluid distribution door tends to move toward a zone of lower pressure, which causes the fluid distribution door to vibrate and flutter.

Typically, the fluid distribution door is a relatively large hinged-free type plate, and can be characterized as a two-dimensional bluff body in aerodynamics. In fluid flow passages of an HVAC module, the fluid distribution door is a bluff body which produces vortex shedding or wakes as fluid flows over exposed surfaces of the fluid distribution door, especially at peak fluid flow and pressure conditions. The vortex shedding and wakes can generate large unsteady forces, even intense vibrations, which have the potential to violently move or damage the structural integrity of the fluid distribution door. For this reason, effects of the vortex shedding need to be controlled to decrease an amplitude of fluctuating lift, as well as drag on the fluid distribution door.

Furthermore, the fluid distribution door should be stiff enough to transfer torque without bending or breaking. If the fluid distribution door bends too much, it provides inadequate sealing and may exhibit creep when the stress and strain approaches or exceeds a yield strength thereof. To prevent bending, prior art fluid distribution doors include additional features such as ribs or other two-dimensional features. However, these features usually increase a weight and a size of the fluid distribution door, as well as cause dimensional instability during a manufacturing, including, for example, warping.

Accordingly, it would be desirable to produce a fluid distribution door for an HVAC system that maximizes performance, efficiency, and structural integrity, while minimizing a cost and a complexity thereof.

SUMMARY OF THE INVENTION

In concordance and agreement with the present invention, a fluid distribution door for an HVAC system that maximizes performance, efficiency, and structural integrity, while minimizing a cost and a complexity thereof, has surprisingly been discovered.

In one embodiment, a fluid distribution door, comprises: a main body having a first surface and a second surface, wherein the first surface and the second surface cooperate to form a first surface configuration and a second surface configuration, wherein the first surface configuration intersects with the second surface configuration.

In another embodiment, a fluid distribution door, comprises: a main body having a first surface and a second surface, wherein the first surface and the second surface cooperate to form a first surface configuration and a second surface configuration, wherein at least one of the first surface configuration and the second configuration is formed by at least one three-dimensional feature.

In yet another embodiment, a fluid distribution door, comprises: a main body having a first surface and a second surface, wherein the first surface and the second surface cooperate to form a first surface configuration and a second surface configuration, wherein at least one of the first surface configuration and the second surface configuration includes a plurality of undulations forming a three-dimensional wave pattern.

Advantageously, the fluid distribution door of the present invention includes the intersecting surface configurations which provide unparalleled strength and torque transmission without increasing a size and weight of the door. Furthermore, the fluid distribution door includes no or minimal rib structure, which minimizes problems associated with warping during manufacturing and the dimensional instability thereof.

DESCRIPTION OF THE DRAWINGS

The above, as well as other objects and advantages of the invention, will become readily apparent to those skilled in the art from a reading of the following detailed description of a preferred embodiment of the invention when considered in the light of the accompanying drawings in which.

DETAILED DESCRIPTION OF EXEMPLARY EMBODIMENTS OF THE INVENTION

Figure 1:
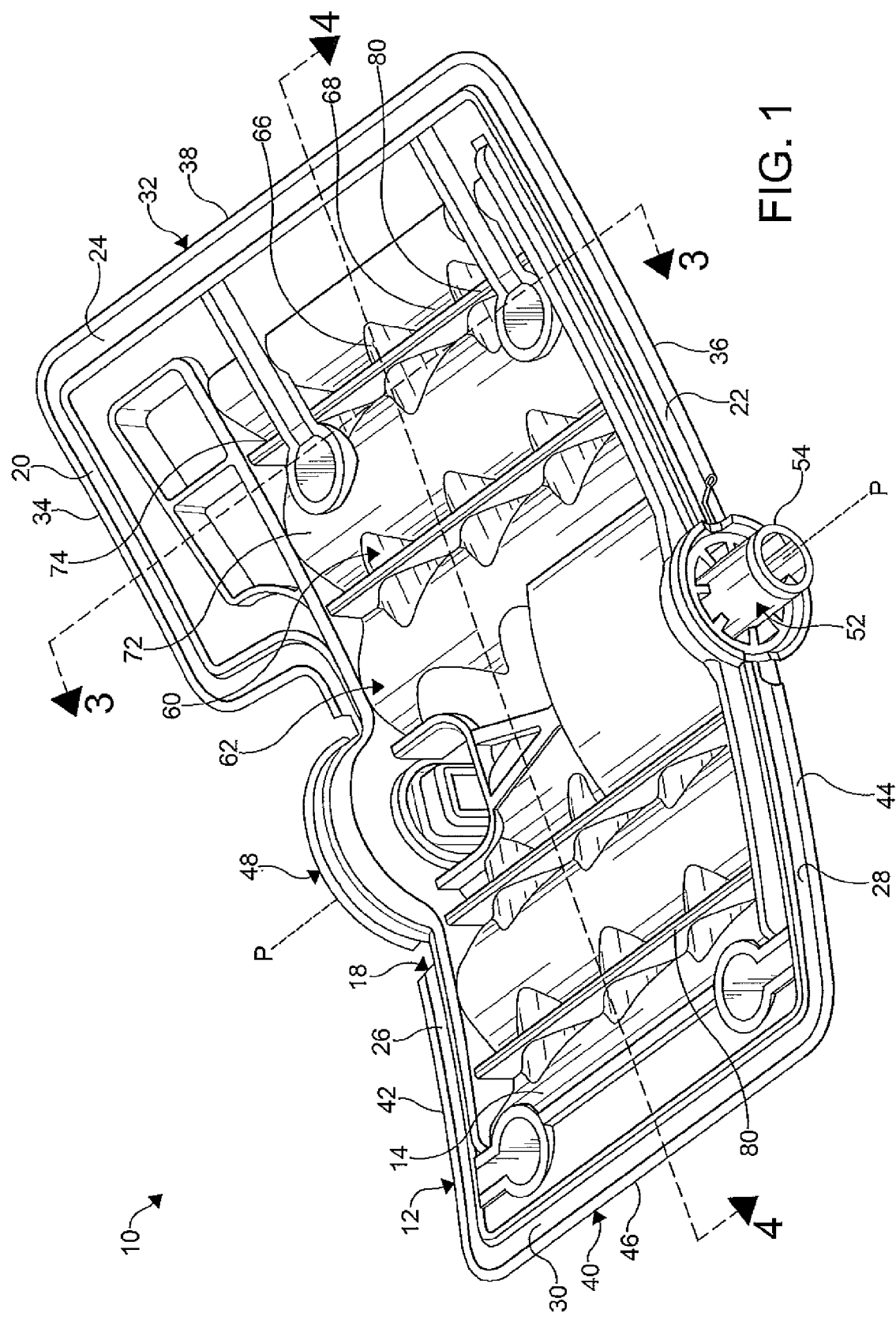
FIG. 1 is a perspective view of a fluid distribution door according to an embodiment of the invention, showing a first surface of the fluid distribution door.

The following detailed description and appended drawings describe and illustrate various exemplary embodiments of the invention. The description and drawings serve to enable one skilled in the art to make and use the invention, and are not intended to limit the scope of the invention in any manner.

FIGS. 1-4 show a fluid distribution door 10 according to the present invention. The fluid distribution door 10 can be employed in an HVAC module 100 shown in FIG. 5 and described hereinafter or other fluid distribution assemblies and systems. The fluid distribution door 10 shown includes a main body 12 having a first surface 14, shown in FIGS. 1 and 3-4, and a coextensive second surface 16, shown in FIGS. 2-4. The main body 12 includes an outer peripheral edge 18, a portion of which is defined by a first laterally extending edge 20, a second laterally extending edge 22, and a third radially extending edge 24 integrally formed between the edges 20, 22. Another portion of the outer peripheral edge 18 of the main body 12 is defined by a first laterally extending edge 26, a second laterally extending edge 28, and a third radially extending edge 30 integrally formed between the edges 26, 28.

A first sealing lip 32 is disposed on the portion of the outer peripheral edge 18 defined by the edges 20, 22, 24. The first sealing lip 32 is defined by a first lateral sealing element 34, a second lateral sealing element 36, and a third radial sealing element 38 integrally formed between the sealing elements 34, 36. A second sealing lip 40 is disposed on the portion of the outer peripheral edge 18 defined by the edges 26, 28, 30. The second sealing lip 40 is defined by a first lateral sealing element 42, a second lateral sealing element 44, and a third radial sealing element 46 integrally formed between the sealing elements 42, 44. Each of the first sealing lip 32 and the second sealing lip 40 is configured to form a substantially fluid-tight seal between the fluid distribution door 10 and a portion of a housing (not shown) of a fluid distribution unit such as the HVAC module 100, for example. The sealing lips 32, 40 can be formed from any suitable material as desired such as a resilient material, a polymeric material, an elastomeric material, a sealing foam, a padding material, and the like, for example.

A pivoting structure 48 is disposed intermediate the edges 24, 30 of the main body 12 and defines a pivot axis P. In a non-limiting example, the pivot structure 48 includes a first pivot member 50 interposed between the edges 20, 26 and a second pivot member 52 interposed between the edges 22, 28. Each of the pivot members 50, 52 shown includes a pivot portion 54 configured to couple the fluid distribution door 10 to a drive mechanism (not shown) of the fluid distribution unit for selectively moving the fluid distribution door 10 about the pivot axis P between various open and closed positions within the housing of the fluid distribution unit.

Figure 3:
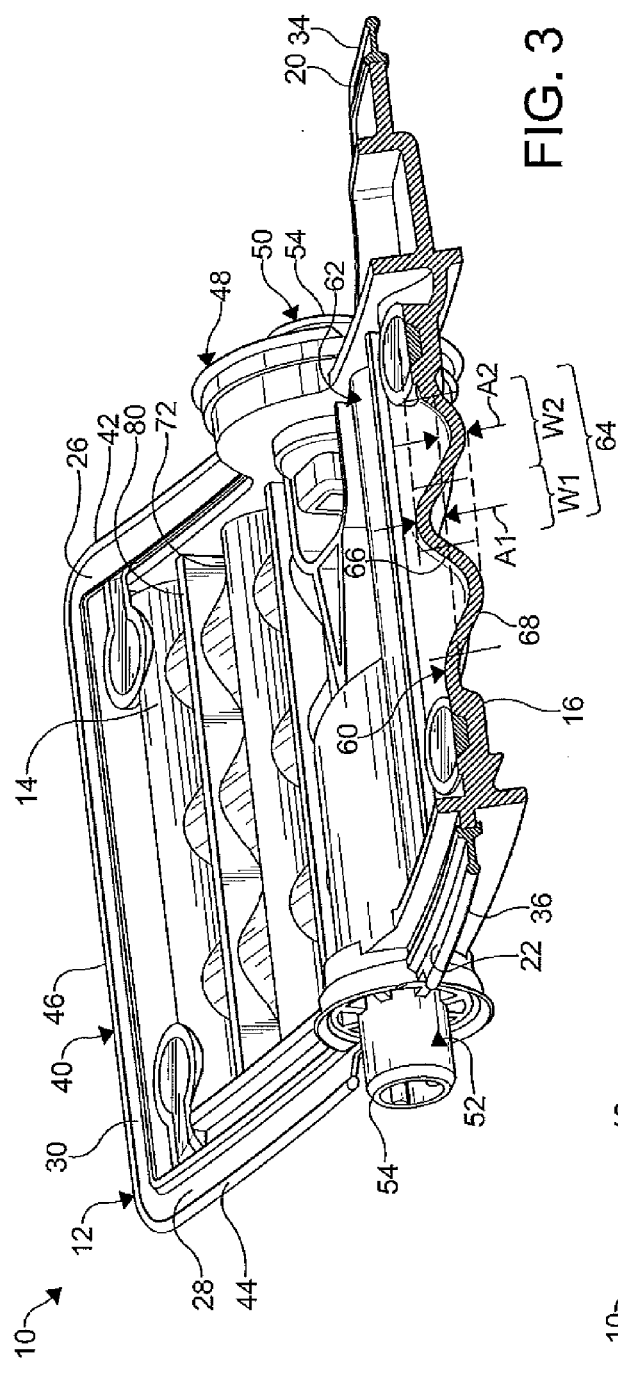
FIG. 3 is a cross-sectional perspective view of the fluid distribution door illustrated in FIGS. 1-2 taken along section line 3-3 of FIG. 1.
Figure 4:
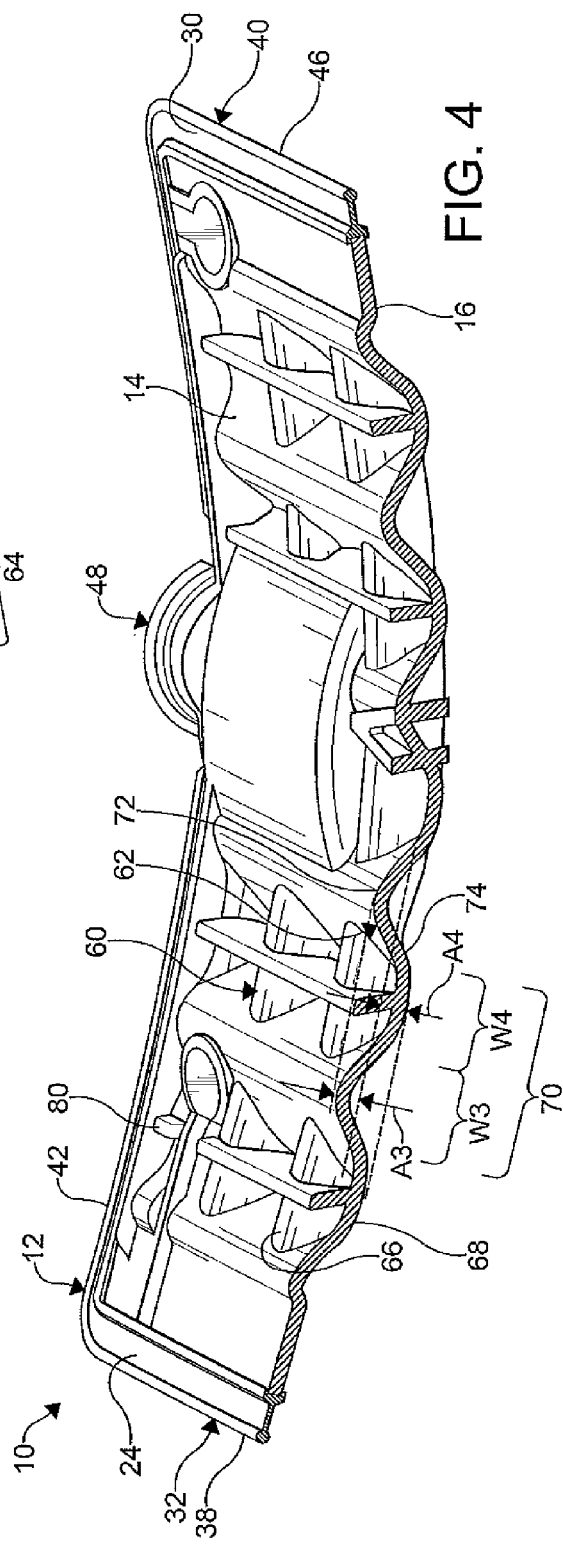
FIG. 4 is a cross-sectional perspective view of the fluid distribution door illustrated in FIGS. 1-3 taken along section line 4-4 of FIG. 1.

As illustrated, the first surface 14 and the second surface 16 cooperate to form one or more first surface configurations 60, which can be best understood from FIG. 3 taken along line 3-3 of FIG. 1, intersecting with one or more second surface configurations 62, which can be understood from FIG. 4 taken along line 4-4 of FIG. 1. The intersecting surface configurations 60, 62 provide control surfaces which attenuate noise, vibrations, and harshness caused by vortex shedding, as well as enhance a structural integrity of the fluid distribution door 10. As shown, the first surface configuration 60 is formed substantially perpendicular to the second surface configuration 62. It is understood, however, that the first surface configuration 60 and the second surface configuration 62 can be formed in any suitable pattern or arrangement as desired.

In certain embodiments, the first surface configuration 60 includes a plurality of three-dimensional undulations 64 forming a wave pattern (i.e. a sine wave pattern) with respect to the pivot axis P. Each of the undulations 64 has a crest 66 and a trough 68. As a non-limiting example, the crests 66 have a substantially constant amplitude (A1) and a substantially constant period (W1) and the troughs 68 have a substantially constant amplitude (A2) and a substantially constant period (W2). It is understood, however, that the amplitude (A1) and/or the period (W1) of one or more of the crests 66 may vary from the respective edges 20, 26 to the respective edges 22, 28 of the main body 12. For example, the amplitude (A1) can increase while the period (W1) can decrease progressively from the respective edges 20, 26 to the respective edges 22, 28 of the main body 12, and vice versa. It is also understood that the amplitude (A2) and/or the period (W2) of one or more of the troughs 68 may vary from the respective edges 20, 26 to the respective edges 22, 28 of the main body 12. For example, the amplitude (A2) can decrease while the period (W2) can increase progressively from the respective edges 20, 26 to the respective edges 22, 28 of the main body 12, and vice versa.

Similarly, the second surface configuration 62 includes a plurality of three-dimensional undulations 70 forming a wave pattern (i.e. a sine wave pattern) with respect to a longitudinal axis of the main body 12. Each of the undulations 70 includes a crest 72 and a trough 74. As a non-limiting example, the crests 72 have a substantially constant amplitude (A3) and a substantially constant period (W3) and the troughs 74 have a substantially constant amplitude (A4) and a substantially constant period (W4). It is understood, however, that the amplitude (A3) and/or the period (W3) of one or more of the crests 72 may vary from the edge 24 to the edge 30 of the main body 12. For example, the amplitude (A3) can increase while the period (W3) can decrease progressively from the edge 24 to the edge 30 of the main body 12, and vice versa. It is also understood that the amplitude (A4) and/or the period (W4) of one or more of the troughs 74 may vary from the edge 24 to the edge 30 of the main body 12. For example, the amplitude (A4) can decrease while the period (W4) can increase progressively from the edge 24 to the edge 30 of the main body 12, and vice versa.

Those skilled in the art will appreciated that the first surface configuration 60 and the second surface configuration 62 can be formed from other three-dimensional features as desired such as a plurality of ellipsoid or other shaped indentations, for example.

Figure 2:
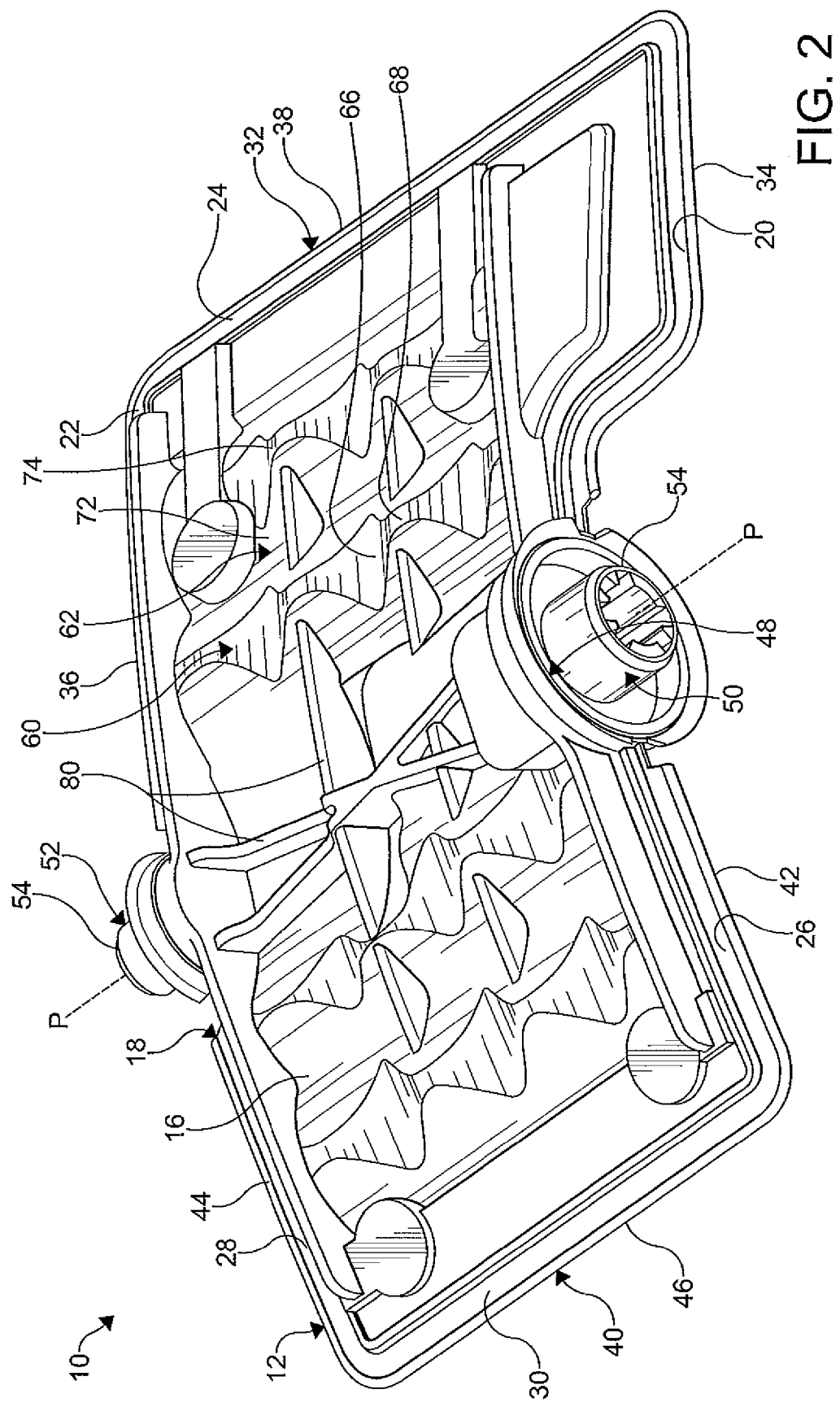
FIG. 2 is a perspective view of the fluid distribution door illustrated in FIG. 1, showing a second surface of the fluid distribution door.

With renewed reference to FIGS. 1-2, the main body 12 may further include one or more support elements 80 formed thereon. In a non-limiting example, each of the support elements 80 is formed on the first surface 14 of the main body 12 substantially parallel to the pivot axis P and extending between the edges 20, 22 along the troughs 74 of the second surface configuration 62. In another non-limiting example, each of the support elements 80 is formed on the second surface 16 of the main body 12 substantially perpendicular to the pivot axis P and extending between the edges 24, 30 along the crests 66 of the first surface configurations 60. In yet another non-limiting example, the support elements 80 are formed on the first surface 14 and the second surface 16 of the main body 12 in a crossing pattern extending between the first pivot member 50 and the second pivot member 52. It is understood, that the support elements 80 can be formed elsewhere on the first surface 14 and/or the second surface 16 of the main body 12 in any suitable arrangement as desired.

Figure 5:
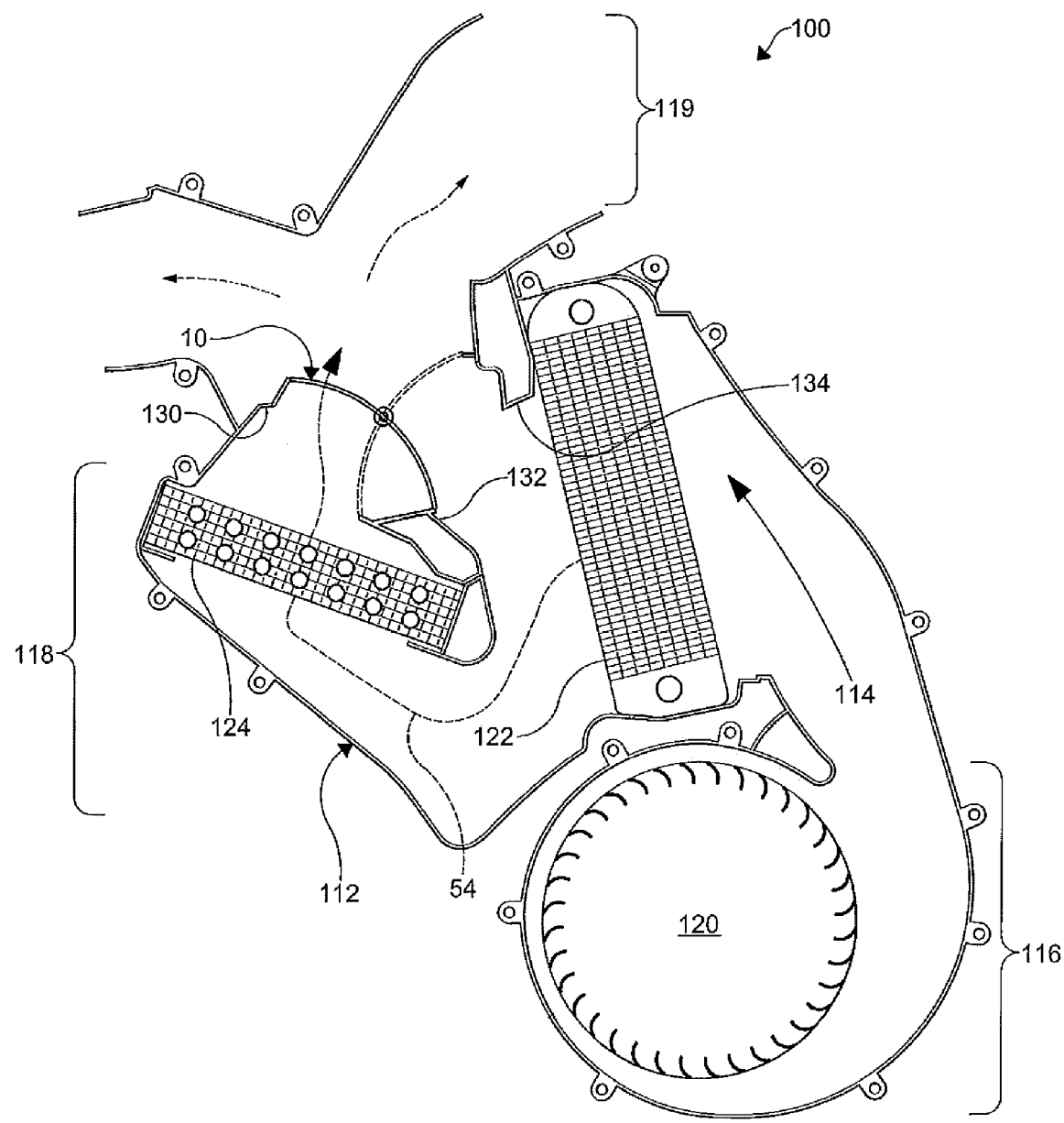
FIG. 5 is a plan view of an HVAC module of an HVAC system for a vehicle, showing the fluid distribution door illustrated in FIGS. 1-4 disposed therein.

As shown in FIG. 5, the present invention further includes a heating, ventilating, and fluid conditioning (HVAC) module 100 for use in a heating, ventilating, and fluid conditioning (HVAC) system or climate control system (not shown) of a vehicle (not shown), which includes the fluid distribution door 10 disposed therein. The HVAC system typically provides heating, ventilation, and fluid conditioning for a passenger compartment (not shown) of the vehicle. The HVAC module 100 of the HVAC system is configured to be installed between vehicle sheet metal (not shown) and an interior trim panel (not shown). It is understood that the HVAC module 100 can be installed in other locations in the vehicle as desired, such as under an instrument panel, to a dash panel, in a trunk, in a console, under a floor, in a headliner, or in an engine compartment, for example.

The HVAC module 100 includes a first housing 112 and a second housing (not shown). In the embodiment shown, the first housing 112 and the second housing are formed from plastic and configured to interface with each other. It is understood that the first housing 112 and the second housing can be formed from other materials as desired. The first housing 112 and the second housing cooperate to form a hollow main housing with a source fluid flow conduit 114 formed therein.

The first housing 112 and the second housing include an inlet section 116, a mixing and conditioning section 118, and a delivery section 119. A fluid inlet aperture 120 is formed in the inlet section 116 and is in fluid communication with a supply of fluid. If desired, a filter (not shown) can be provided upstream or downstream of the inlet section 116. The supply of fluid can be provided from outside of the vehicle, recirculated from the passenger compartment of the vehicle, or a mixture of the two, for example. The mixing and conditioning section 118 receives an evaporator core 122, a heater core 124, and the fluid distribution door 10 therein. The evaporator core 122 and the heater core 124 are in communication with a source of cooled fluid (not shown) and a source of heated fluid (not shown) respectively.

The mixing and conditioning section 118 includes a first housing wall 130, a second housing wall 132, and a third housing wall 134. It is understood that the housing walls 130, 132, 134 can be formed integrally with other structure of the mixing and conditioning section 118, or can be formed separately and mounted in the mixing and conditioning section 118. The first housing wall 130 and the second housing wall 132 sealingly engage the fluid distribution door 10 while the system is in a cold position indicated by solid lines in FIG. 5. Conversely, the second housing wall 132 and the third housing wall 134 sealingly engage the fluid distribution door 10 while the system is in a hot position indicated by dashed lines in FIG. 5.

In operation, the HVAC module 100 conditions the fluid by heating or cooling/dehumidifying the fluid and providing the conditioned fluid to the passenger compartment of the vehicle. The fluid is drawn into the HVAC module 100 through the fluid inlet aperture 120, flows through the source fluid flow conduit 114, and into the mixing and conditioning section 118. The fluid flows to the evaporator core 122 where the fluid is cooled and dehumidified. The conditioned, cooled fluid stream then exits the evaporator core 122. The fluid then flows through the HVAC module 100 according to the position of the fluid distribution door 10.

As illustrated, the volume and temperature of fluid permitted to flow through the mixing and conditioning section 118 depends on the position of the fluid distribution door 10. As the fluid distribution door 10 approaches the hot position, additional fluid is permitted to flow through the heater core 124. It is further understood that a temperature of the conditioned fluid stream upstream of the delivery section 119 can be controlled as desired between a maximum temperature equal to the temperature of the fluid exiting the heater core 124 and a minimum temperature equal to the temperature of the fluid exiting the evaporator core 122 by controlling the position of the fluid distribution door 10. The fluid distribution door 10 may be disposed elsewhere within the HVAC module 100 to selectively control the flow of fluid through the delivery section 119 and an entry location the fluid flow into the passenger compartment.

From the foregoing description, one ordinarily skilled in the art can easily ascertain the essential characteristics of this invention and, without departing from the spirit and scope thereof, can make various changes and modifications to the invention to adapt it to various usages and conditions.

The invention claimed is:

1. A fluid distribution door configured for use in a heating, ventilating, and air conditioning system of a vehicle, the fluid distribution door comprising:
a main body having a first surface, wherein the first surface includes a first wave pattern and a second wave pattern formed therein, the first wave pattern including a plurality of first crests and a plurality of first troughs extending in a first direction and the second wave pattern including a plurality of second crests and a plurality of second troughs extending in a second direction transverse to the first direction.

2. The fluid distribution door of claim 1, wherein the first wave pattern is formed substantially perpendicular to the second wave pattern.

3. The fluid distribution door of claim 1, wherein the main body includes at least one support element formed thereon.

4. The fluid distribution door of claim 1, wherein an outer peripheral edge of the main body includes at least one seal disposed thereon.

5. The fluid distribution door of claim 1, wherein at least one of a shape and a size of each of the first crests is substantially constant across the first wave pattern and wherein at least one of a shape and a size of each of the first troughs is substantially constant across the first wave pattern.

6. The fluid distribution door of claim 1, wherein at least one of a shape and a size of each of the first crests varies across the first wave pattern and wherein at least one of a shape and a size of each of the first troughs varies across the first wave pattern.

7. The fluid distribution door of claim 1, wherein the main body includes a second surface formed opposite the first surface, the second surface including a plurality of third crests aligned with and complimenting the first troughs and a plurality of third troughs aligned with and complimenting the first crests, the second surface further including a plurality of fourth crests aligned with and complimenting the second troughs and a plurality of fourth troughs aligned with complimenting the second crests.

8. The fluid distribution door of claim 1, wherein at least a portion of the first wave pattern intersects the second wave pattern.

9. The fluid distribution door of claim 1, wherein the first surface includes at least one of the first crests intersecting at least one of the second crests.

10. The fluid distribution door of claim 9, wherein the first surface includes at least one of the first troughs intersecting at least one of the second troughs.

11. The fluid distribution door of claim 1, wherein the first wave pattern cooperates with the second wave pattern to include a plurality of first intersections of the first crests with the second crests and a plurality of second intersections of the first troughs with the second troughs.

12. The fluid distribution door of claim 11, wherein the first intersections form a first grid pattern and the second intersections form a second grid pattern.

13. The fluid distribution door of claim 1, wherein the first wave pattern is a sine wave pattern and the second wave pattern is a sine wave pattern.

14. The fluid distribution door of claim 1, wherein each of the first crests, the first troughs, the second crests, and the second troughs has a curvilinear profile.

* * * * *